United States Patent
Boissonnat et al.

(10) Patent No.: US 7,402,268 B2
(45) Date of Patent: Jul. 22, 2008

(54) METHOD FOR MAKING A COMPOSITE EXTRUDED PROFILE FORMED WITH THERMOPLASTIC ORGANIC MATERIAL REINFORCED WITH REINFORCING FIBRES

(75) Inventors: Philippe Boissonnat, Challes les Eaux (FR); Edward Cooper, St Catharines (CA); Guy Zanella, Cognin (FR); Remi Carel, Lyons (FR); Philippe Macquart, Asnieres (FR); Thierry Gay, Cluny (FR)

(73) Assignee: OCV Intellectual Capital, LLC (DE) (US)

( * ) Notice: Subject to any disclaimer, the term of this patent is extended or adjusted under 35 U.S.C. 154(b) by 637 days.

(21) Appl. No.: 10/258,524

(22) PCT Filed: Apr. 25, 2001

(86) PCT No.: PCT/FR01/01259

§ 371 (c)(1),
(2), (4) Date: Oct. 7, 2003

(87) PCT Pub. No.: WO01/81073

PCT Pub. Date: Nov. 1, 2001

(65) Prior Publication Data

US 2006/0087059 A1    Apr. 27, 2006

(30) Foreign Application Priority Data

Apr. 25, 2000    (FR) .................................. 00 05260

(51) Int. Cl.
*B29C 39/18*    (2006.01)
*B29C 43/22*    (2006.01)

(52) U.S. Cl. ........................ 264/255; 264/556; 264/148; 264/237; 264/348

(58) Field of Classification Search .................. 264/555, 264/556, 148, 237, 348
See application file for complete search history.

(56) References Cited

U.S. PATENT DOCUMENTS

| 4,883,625 | A | * | 11/1989 | Glemet et al. ................ 264/136 |
| 5,225,140 | A | * | 7/1993 | Hayashikoshi et al. ...... 264/571 |
| 5,830,304 | A | * | 11/1998 | Priesnitz et al. ............. 156/166 |
| 5,879,602 | A | * | 3/1999 | Scheuring .................... 264/136 |
| 2003/0157280 | A1 | * | 8/2003 | Boissonnat et al. ......... 428/34.1 |

FOREIGN PATENT DOCUMENTS

| DE | 44 21 184 | 12/1995 |
| EP | 0 602 618 | 6/1994 |
| JP | 04 073235 | 3/1992 |

* cited by examiner

*Primary Examiner*—Suzanne E. McDowell
(74) *Attorney, Agent, or Firm*—Margaret S. Millikin

(57) ABSTRACT

A process for manufacturing a composite profile based on a thermoplastic organic material reinforced by reinforcing fibres includes making a multiplicity of continuous reinforcing yarns come into contact with a thermoplastic organic material and shaping the composite profile. Continuous yarns based on continuous glass fibres and on a first thermoplastic are brought together to be parallel and at least one consolidated tape is formed by heating them, in which tape the reinforcing fibres are impregnated with the first thermoplastic. The at least one tape is introduced into a die sized to the cross-section of the profile and at least one second molten thermoplastic organic material is simultaneously introduced into the die in contact with the tape, to obtain a profile of at least one second thermoplastic organic material reinforced by the at least one tape.

11 Claims, 4 Drawing Sheets

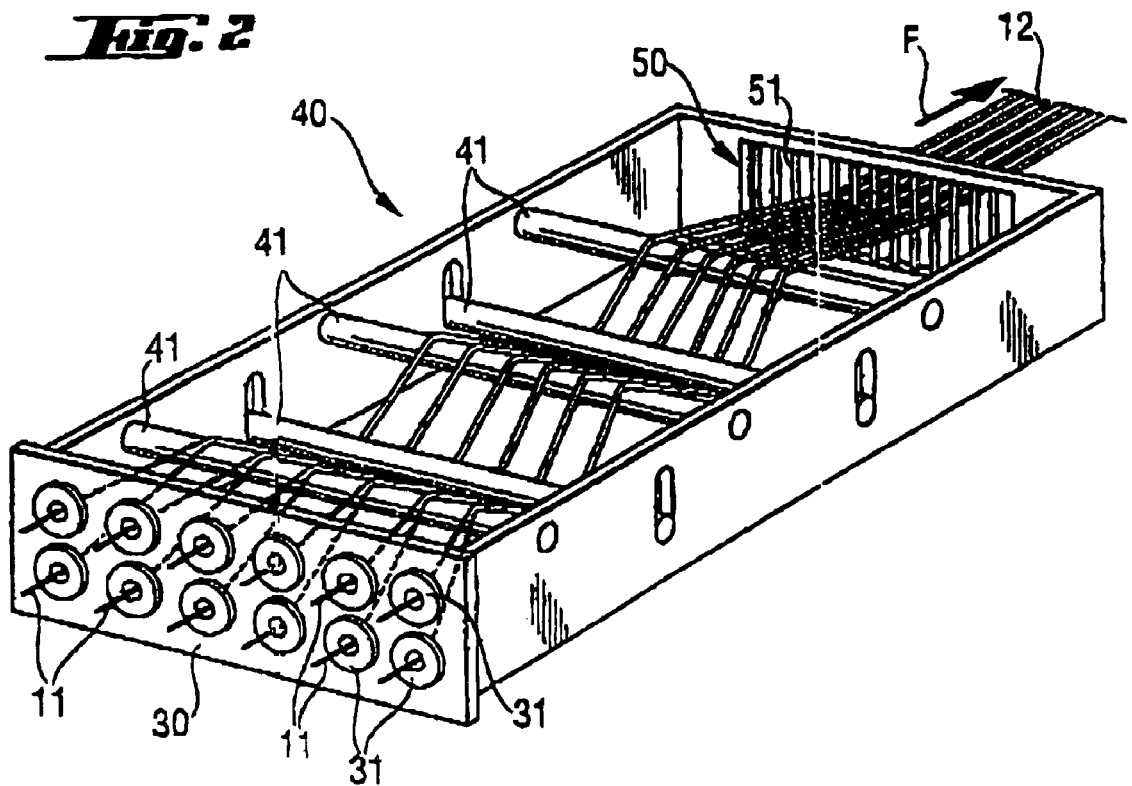
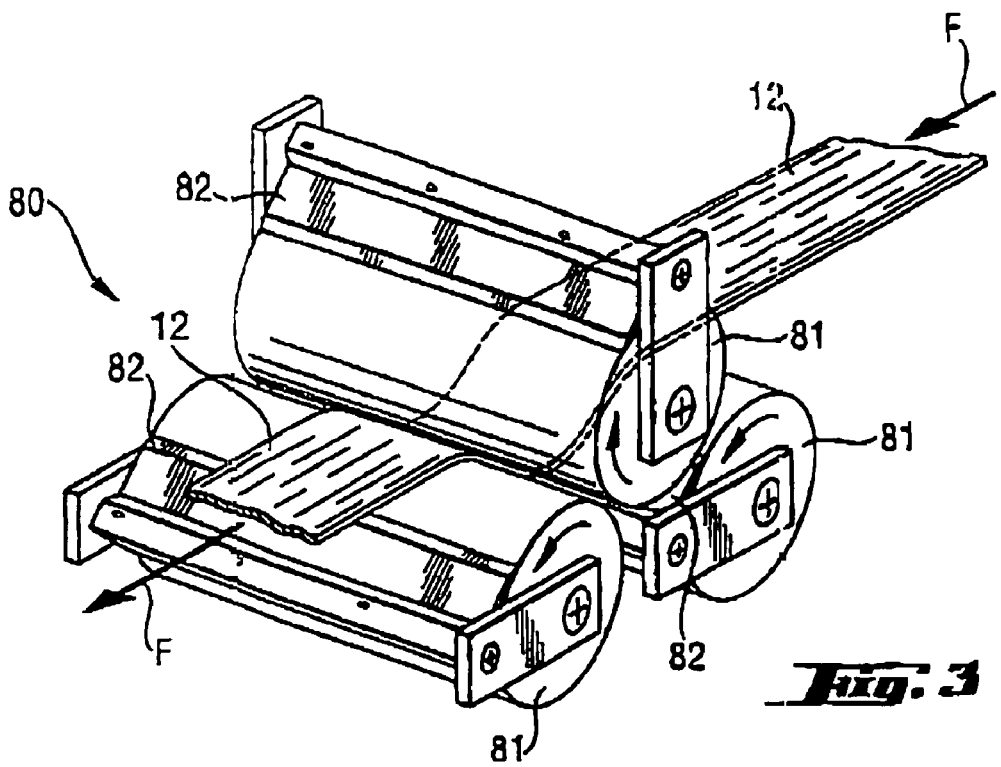

METHOD FOR MAKING A COMPOSITE EXTRUDED PROFILE FORMED WITH THERMOPLASTIC ORGANIC MATERIAL REINFORCED WITH REINFORCING FIBRES

BACKGROUND OF THE INVENTION

1. Field of Invention

The invention relates to the manufacture of a composite profile based on a thermoplastic organic material reinforced with reinforcing fibres.

2. Discussion of the Background

For the sake of lightening a wide range of products, it is common practice to manufacture articles from plastic instead of more dense materials, the plastic being intrinsically reinforced, especially with fibrous reinforcements, in order to maintain the mechanical strength of the product.

It is known to use reinforcements comprising short fibres which are mixed directly with the plastic or are introduced in the form of composites such as granules comprising the reinforcements in a resin or plastic matrix. However, these short fibres do not make it possible to produce all the desired types of reinforcements, especially those for increasing the flexural strength of articles in one direction by a certain extent.

There are reinforcements based on continuous fibres in the form of cloths or fabrics more especially suitable for the manufacture of articles by moulding.

The incorporation of continuous reinforcing fibres into a profiled article, characterized by a long length compared with its other two dimensions, continues, however, to raise a few difficulties. This is because the technique of moulding is expensive and it appears to be desirable to develop other manufacturing solutions.

Patent Application FR 2,516,441 discloses a process for manufacturing thin profiles comprising unidirectional continuous glass fibres embedded in a thermoplastic resin.

The steps of the process for obtaining such profiles are as follows:
- unwinding glass yarns from wound packages, in order to form a sheet of yarns;
- separating the fibres of the yarns, in order to separate them because of the size with which they are coated;
- dipping the sheet of glass fibres into an aqueous bath of a thermoplastic or else into a fluidized bed of powder of a thermoplastic;
- heating the sheet in order to evaporate the water or to melt the powder, depending on the mode of dipping;
- hot-shaping the resin-encapsulated sheet of fibres so as to produce the desired section.

One drawback with this process is that it is necessary, in order for the fibres to be uniformly impregnated with the thermoplastic, to introduce the step of separating the fibres. This requires a specific device using several rollers, the number and arrangement of which, for ensuring the suitable winding angle of the sheet on these rollers, are determined by the degree to which the fibres stick together.

In addition, it is sometimes necessary, when the degree of sticking is too high, to provide heating means complementary to the rollers.

Consequently, there is a possibility that all the fibres are not completely separated from each other, in order subsequently to allow them to be encapsulated with the thermoplastic.

Moreover, the process uses for the impregnation a bath of a thermoplastic which has to be maintained at a constant level, the dispersion of which thermoplastic is constantly circulated in order to ensure as constant an impregnation as possible.

Furthermore, the means employed in this bath are considerable and difficult to manage in a manufacturing line; these are elements such as a liquid delivery pump, a weir for establishing a constant level, a storage tank for the overflow, and a stirring device for ensuring that the contents of the bath are homogeneous, these elements having to be regularly cleaned.

In the variant of the impregnation device for the use of a fluidized bed, specific means are also necessary, especially a vibrating system mounted on springs, for metering the amount of powder taken away by the fibres.

Finally, the shaping device consists of a lower roller provided with a groove through which the sheet runs and of an upper roller serving to press the sheet. Thus, the various expected gauges of the profile entail the drawback of having to have available several rollers which have variously sized grooves, respectively.

Consequently, this process, being slow to carry out, proves to be expensive and of low performance.

This process is furthermore limited to the production of thin profiles and offers little freedom as regards the design of the cross section of the profile, especially if it is desired to adjust the amount of plastic in certain portions of the profiled cross section.

The object of the present invention is therefore to provide a process for manufacturing a composite profile based on a thermoplastic organic material reinforced by reinforcing fibres, which is easy and rapid to implement, as well as being economic from the industrial standpoint.

More particularly, the invention provides, by virtue of this process, a product in the form of a profile consisting, on the one hand, of at least one tape of continuous reinforcing yarns arranged so as to be approximately parallel and touching each other and consolidated by a first thermoplastic and, on the other hand, of at least one second plastic in intimate contact with the said tape(s).

SUMMARY OF THE INVENTION

According to the invention, the process for manufacturing the tape is characterized in that it comprises at least the following steps:
- continuous yarns based on continuous glass fibres and on a first thermoplastic are brought together so as to be parallel and at least one consolidated tape is formed by heating them, in which tape the reinforcing fibres are impregnated with the first thermoplastic; and
- at least one tape is introduced into a die sized to the cross section of the profile and at least one second molten thermoplastic organic material is simultaneously introduced into the said die in contact with the tape or tapes, so as to obtain a profile consisting of at least one second thermoplastic organic material reinforced by at least one tape.

As will also be explained below, the term "tape" is understood within the meaning of the present description to be a material in the form of a strip, which may be essentially flat, or may have a shape of more complex cross section in which each portion can be likened to a strip.

The tape may be flexible, especially capable of being wound when the tape is essentially flat, or may be more or less rigid.

Moreover, the term "consolidated" is understood to mean that the glass fibres are impregnated with the first thermoplastic so that the tape has a certain cohesion and an integrity which make it possible for it to be handled without being damaged.

According to the invention, the preliminary manufacture of a consolidated reinforcement guarantees integration of the reinforcement in the desired form and with the desired geometry in the profile, and the impregnation with the first thermoplastic guarantees, moreover, true bonding of the reinforcement to the second thermoplastic or thermoplastics of which the body of the profile is composed.

According to one particular method of implementation, the tape is formed from continuous yarns comprising glass yarns and organic fibres of the said first thermoplastic.

According to a preferred characteristic, the yarns which are brought together consist of continuous glass filaments and continuous thermoplastic filaments which are co-mingled together. The intimate structure of these yarns facilitates the impregnation of the glass fibres with the thermoplastic and in particular it improves the uniformity of the impregnation in order to form a consolidated tape which is itself very uniform.

The said first thermoplastic may be chosen from polyolefins, especially polyethylene and polypropylene, and from polyesters, especially polyethylene terephthalate and polybutylene terephthalate.

According to one particular method of implementation, for forming the tape:
yarns based on the first thermoplastic and on glass fibres are entrained and brought together in a parallel manner in the form of at least one sheet;
at least one sheet is made to enter a zone in which it is heated to a temperature reaching at least the melting point of the first thermoplastic without reaching the softening temperature of the reinforcing fibres;
at least one sheet is made to pass through an impregnation device, while maintaining its temperature at a temperature at which the first thermoplastic is malleable, in order to distribute the first molten thermoplastic uniformly and to impregnate the glass fibres therewith.

According to another characteristic, at least one sheet is introduced into a first shaping device, while maintaining its temperature at a temperature at which the first thermoplastic is malleable, so as to obtain at least one tape formed by bringing the yarns together so as to be touching, thereby creating transverse continuity.

According to another characteristic, the process comprises a step consisting in unreeling, from wound packages, a continuous yarn of reinforcing filaments and filaments of the first thermoplastic and, while the yarns are being brought together in the form of a sheet, in regulating the tension in the yarns.

Advantageously, the yarns are stripped of any static electricity before the sheet passes into the heating zone.

According to particular methods of implementation, an essentially flat tape, or on the contrary a tape shaped to a particular outline, is formed in the first step.

According to one characteristic, the tape is deformed upon its introduction into the die, which therefore fulfils the role of a second shaping device.

According to another characteristic, at least one second thermoplastic, which has been conditioned by an extruder, is introduced into the die. Such a thermoplastic may especially be a polyolefin or polyvinyl chloride.

According to another characteristic, the profile is cooled in order to fix its dimensional characteristics and its appearance, and to deliver the finished profile.

According to another characteristic, the profile is cut up at the end of the manufacturing line in order to be stored.

As regards the apparatus for implementing the process, this is essentially characterized in that it comprises:
means for bringing together in a parallel manner continuous yarns based on continuous glass fibres and on a first thermoplastic, and means, especially heating means, for forming at least one consolidated tape in which the glass fibres are impregnated with the first thermoplastic; and
a die sized to the cross section of the profile and means for simultaneously introducing at least one tape and at least one second molten thermoplastic organic material into the said die in contact with the tape or tapes, so as to obtain a profile consisting of at least one second thermoplastic organic material reinforced with at least one tape.

According to one embodiment, the apparatus comprises:
means for entraining the continuous yarns consisting of reinforcing filaments and filaments of a first thermoplastic and means for bringing the said continuous yarns together into the form of at least one sheet;
means for heating at least one sheet to a temperature reaching at least that of the melting point of the first thermoplastic, but not the softening temperature of the glass filaments;
a device for impregnating at least one heated sheet so as to distribute the first molten thermoplastic uniformly and allow the glass filaments to be impregnated therewith.

According to one characteristic, the apparatus includes heating means consisting of ovens.

According to another characteristic, the means for bringing the yarns together consist of a comb, the tines of which produce a uniformly-spaced parallel alignment of the yarns.

According to another characteristic, means for regulating the tension in the yarns are provided upstream of the means for bringing the yarns together.

According to an advantageous variant, an anti-static device is provided upstream of the heating means.

According to another characteristic, the impregnation device comprises three members which are arranged in a triangle and between which the sheet runs, the member separation height being adapted in order to apply suitable pressure to the surface of the sheet. The members may be rotating heated rolls or stationary heated bars.

Advantageously, each roll has a blade for scraping off the molten thermoplastic deposited on the roll after the sheet has passed.

According to another characteristic, the apparatus includes a first device for shaping at least one sheet so as to convert it into at least one tape.

According to another characteristic, the shaping device comprises a die, which is advantageously heated, and/or rollers between which the sheet of yarns runs.

One particular shaping device also centres the sheet and comprises a lower roller and an upper roller which are offset one above the other and rotate in opposite directions, the upper roller being in the form of a hyperboloid, and the sheet being concentrated around the central running axis as it passes between the two rollers in order to deliver a tape constituting a mutually contiguous association of yarns.

According to yet another characteristic, the apparatus according to the invention includes, upstream of the die by means of which the second thermoplastic(s) is (are) formed, or this die itself includes, means for positioning and/or shaping at least one tape for making it come into contact with at least one second thermoplastic.

According to one embodiment, the die includes means for bringing the second molten thermoplastic into contact with the tape by applying an overpressure thereto.

According to another characteristic, an extruder delivers at least one second molten thermoplastic into the said die.

According to yet another characteristic, the apparatus includes a device for cooling the profile, especially by exposure to air or to a coolant and/or by contact with members having cold or cooled surfaces, making it possible to freeze the second thermoplastic(s) and/or the first thermoplastic and to mutually consolidate the yarns and form the final profile.

In particular, the apparatus may include a cooling calender, especially consisting of two rotating cooling rolls which are arranged one above the other and which do not have guiding edges, the calender thus giving the profile its final shape.

Advantageously, the apparatus may include a cold or cooled die, generally having the same outline and the same dimensions as the first die receiving the tape and the second thermoplastic(s).

According to an advantageous characteristic, the apparatus may include means for spraying liquid, which would make it possible to cool the running profile.

DESCRIPTION OF THE DRAWINGS

Further advantages and characteristics will now be described with regard to the drawings in which:

FIGS. 2 to 6 are perspective views of certain parts of the apparatus shown in FIG. 1, respectively, of a device for regulating the tension in the yarns, the rotating impregnation device, two variants of the first shaping device and of the second shaping device;

DETAILED DESCRIPTION OF THE INVENTION

Figure 1:
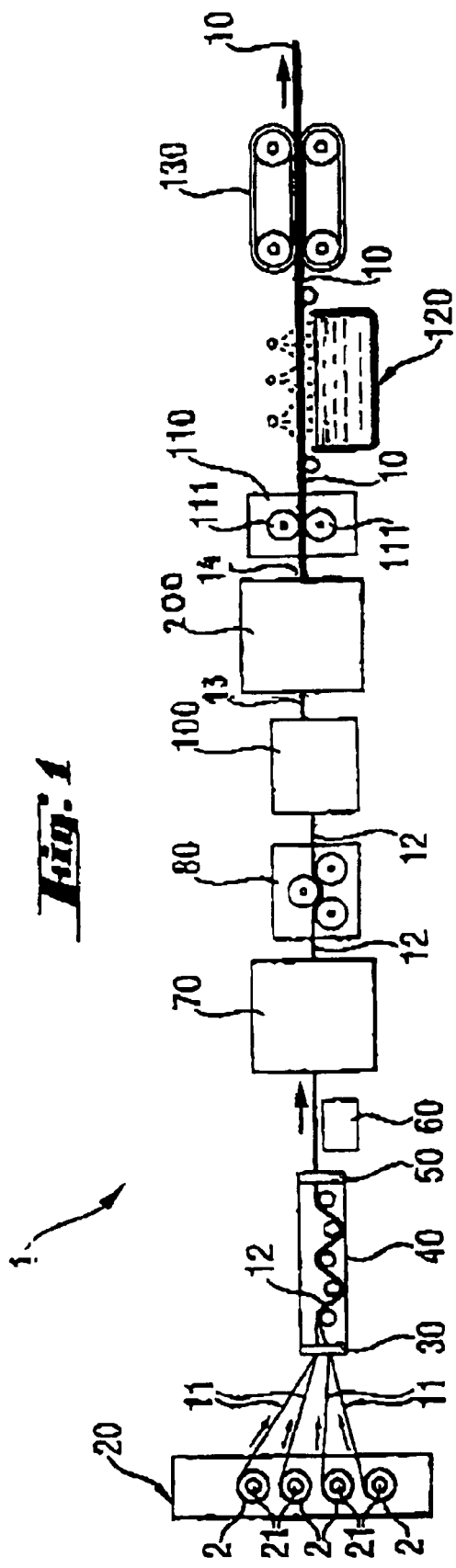
FIG. 1 is a schematic side view of the apparatus for manufacturing a tape according to the invention.

The apparatus 1 seen in FIG. 1 allows manufacture of a profile 10 according to the invention, which consists, on the one hand, of at least one tape of continuous reinforcing yarns arranged so as to be mutually parallel and contiguous and consolidated together by a first thermoplastic, and, on the other hand, of at least one second plastic in intimate contact with the said tape(s).

Each yarn, sold by Vetrotex under the brand name TWIN-TEX® and manufactured according to the process described in Patent EP 0,599,695, consists of glass filaments and of filaments of a thermoplastic organic material, of the polyolefin or polyester type, which are intimately co-mingled.

The manufacturing apparatus 1 comprises, in the form of a line and going from the upstream end to the downstream end, a creel 20 provided with several wound packages 2 of yarn 11, an eyeletted plate 30, a device 40 for regulating the tension in the yarns, a comb 50, a device 60 for removing static electricity, an oven 70, an impregnation device 80, a first shaping device 100, especially a die, a second shaping device, especially a die 200, an extruder 300, a calender 110, a cooling tank 120 and a caterpillar haul-off 130.

The purpose of the creel 20 is to uncreel the yarn 11 from each package 2. It may be of the unreeling type and be composed of a frame provided with horizontal rotating spindles 21, each supporting a package 2.

As a variant, it is possible to use a pay-out creel, but this induces a twist into the yarn which is not constant, ranging from one turn per 50 cm to one turn per 1 m. This twist has the effect of limiting the minimum thickness of the finished tape, it not being possible in particular for this to go below 0.3 mm in the case of packages of 982 tex yarn. Furthermore, this twist favours entanglement of the yarns as they run along the tape manufacturing line, thereby causing knots and/or non-parallel and non-taut yarns 11 in the tape once it has been formed.

Consequently, it may be preferred to use an unreeling creel, in particular for producing a small tape thickness (of less than 0.2 mm). However, in this case it proves to be necessary to provide a regulating device, referenced 40 in FIGS. 1 and 2, which makes it possible to adjust the overall level of tension in the sheet of yarns.

The eyeletted plate 30, which can also be seen in FIG. 2, lies in a vertical plane parallel to the rotating spindles 21 of the creel. It makes it possible to group together the yarns 11, each of which passes through an eyelet 31 in order to be guided towards the tension-regulating device 40 at an angle appropriate to the desired tension. The eyelets 31 are made, in a known manner, of a ceramic in order to prevent the yarns from being damaged as they pass through them.

The tension-regulating device 40 which is illustrated in FIG. 2 is combined with the eyeletted plate 30. It comprises a series of cylindrical bars 41 arranged in a staggered configuration one above another, the yarns 11 coming from the eyeletted plate 30 travelling over and under these bars so as to define identical sinusoids, the amplitude of which influences the tension in the yarns. The height of the bars can be adjusted so as to be able to modify the amplitude of the sinusoids, an increased amplitude imposing a higher tension in the yarns.

The bars are advantageously made of brass or of a ceramic in order to limit the static electricity phenomena induced by the rubbing of the yarns. Placed at the exit of the device 40 is a comb 50 whose tines 51 group the yarns 11 together into a uniformly-spaced parallel alignment in order to obtain a sheet 12 in the form of bundles of yarns.

Installed between the comb 50 and the entrance of the oven 70 is an electrical device 60 serving to remove any static electricity with which the yarns 11 might be charged, so as to prevent the said yarns from bulking which, otherwise, would cause them to degrade in the oven 70.

The oven 70 operates by convection of hot air. It could just as well be an infrared oven.

By passing through the oven 70, the sheet 12 is heated to a temperature such that on leaving the oven the sheet has a temperature high enough to reach the melting point of the thermoplastic of the yarns 11 so that the molten thermoplastic sticks together and is embedded in the glass filaments of the entire sheet 12.

The oven 70 may consist of two successive ovens: a first oven upstream of the second with respect to the running direction. The purpose of the first oven is to heat the sheet 12 as described above and the purpose of the second oven is to condition the sheet to a lower temperature suitable for introducing the sheet into the shaping device 100.

Located after the oven 70 there is a rotating impregnation device 80 which flattens the sheet 12 so as to expel the air contained between the yarns, distribute the molten thermoplastic uniformly over the width of the sheet and guarantee that the glass filaments are completely impregnated with the thermoplastic.

The impregnation device 80 consists of three members arranged in a triangle between which the sheet 12 runs. In a first embodiment, the members may consist of stationary bars, the separation of which is adjusted in order to control the pressure needed for the impregnation. The bars may be heated in order to maintain the thermoplastic at a temperature at which it is malleable but without sticking to the surface of the bars. For this purpose, the surface may be made of a suitable material or else be specifically treated.

In a variant, which can be seen in FIG. 3, the device 80 consists of three mutually parallel rolls 81 arranged in a triangle so as to have two lower rolls and one upper roll. The rolls are heated and reach a temperature high enough to maintain the thermoplastic of the sheet in a malleable state.

The rolls 81 rotate, the lower ones rotating in the positive direction with respect to the running direction F of the sheet 12 while the upper one rotates in the opposite direction, the rotation speeds being identical and corresponding to that at which the sheet runs.

The height of the upper roll can be adjusted in order to apply pressure to the sheet 12 high enough to ensure that the glass is impregnated with the thermoplastic.

Since the rolls 81 are in contact with the sheet, a film of thermoplastic is rapidly deposited onto their surfaces. Advantageously, the said rolls each have a blade 82 whose action is to scrape their surfaces and whose purpose is at the same time to prevent the formation of any spurious winding of the glass filaments and to help in achieving homogeneous distribution of the molten thermoplastic along the length of the tape. Thus, should there be an excessively thick film on each roll, this excess is used to supplement the encapsulation of the glass filaments which might be insufficiently coated.

The inclination of the blades 82 can be adjusted so as to optimize their effectiveness.

As a variant, for the same purpose of regulating the distribution of thermoplastic, instead of using the blades 82 the three rolls are driven at a slightly lower speed of rotation than the speed at which the sheet runs. This solution means that not only do the rolls 82 have to be driven but also that a speed control mechanism has to be installed.

Note that it would be conceivable to use an oven in which the impregnation device 80 would be housed, the impregnation device being able to withstand the temperature of the oven.

Placed at the exit of the oven is a first shaping device 100 which may comprise a die of sized cross section suitable for shaping the sheet to the desired shape and dimensions of the tape. Depending on various embodiments, the die orifice may be approximately rectangular, in order to form a flat tape, which may possibly be deformed thereafter, or may be of more complex shape in order to form a tape shaped according to a particular profile. The die orifice is advantageously made in a removable part which is fixed to a stationary support, thereby making it easy to clean and replace.

Advantageously, the die is heated in order to maintain the shaping surfaces at a temperature close to the melting point of the thermoplastic of the sheet or the temperature at which the thermoplastic is malleable. For example, it is heated by one or more electrical resistance band heaters wrapped around one or more zones of the die.

Figure 4:
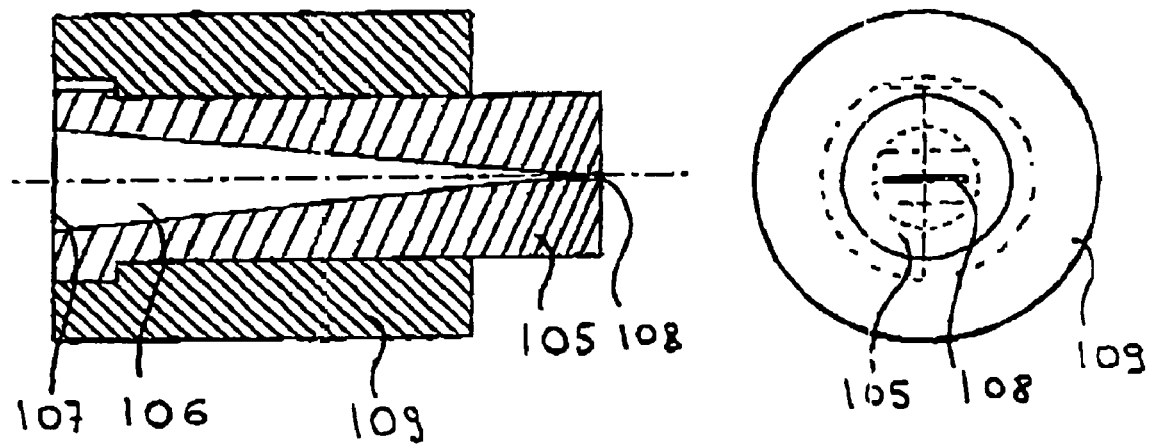

FIG. 4 shows a first shaping device 100 consisting of a die. The latter comprises an approximately cylindrical body 105 having a wide opening 107 upstream, via which the sheet 12 is introduced, a cavity 106, the width of which is constant and the height of which decreases down to the desired thickness of the tape to be formed, and, downstream, an exit 108 via which the tape 13 formed leaves. Part of the approximately cylindrical body 105 is placed in a heater unit 109. The heating may especially be provided by electrical resistance elements in the form of band heaters placed around the heating unit 109 and possibly around that part of the approximately cylindrical body 105 which extends beyond the heater unit 109.

As a variant, the shaping device 100 may comprise rollers of various shapes between which the sheet of yarns runs. Although it is also possible to manufacture a shaped tape according to this variant, it is more particularly intended for the production of a flat tape.

Figure 5:
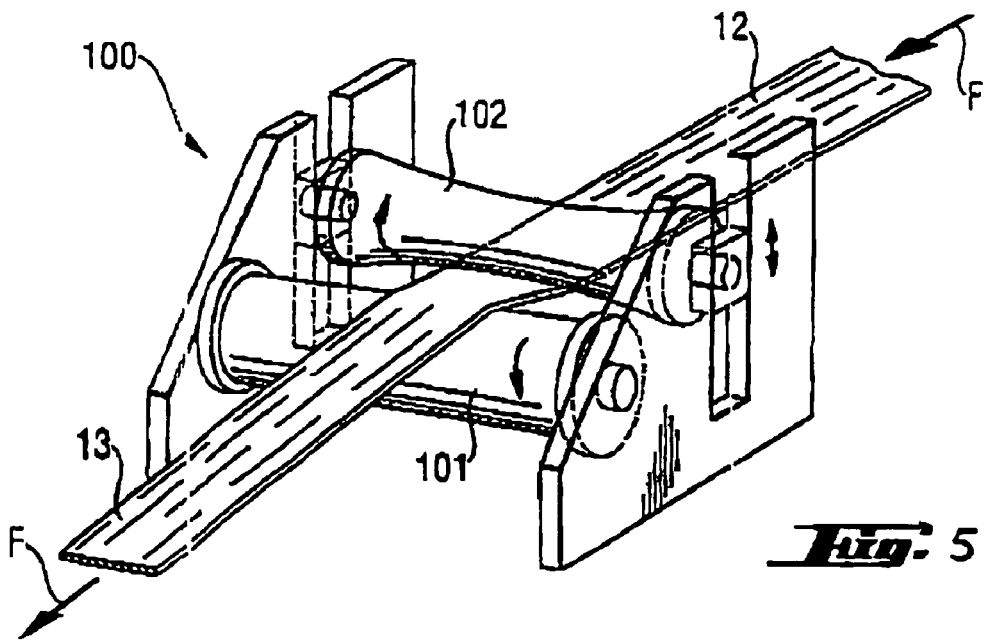

Thus, the device according to this variant comprises, as illustrated in FIG. 5, a cylindrical lower roller 101 and a hyperboloidal upper roller 102 which is slightly offset upstream with respect to the vertical through the lower roller, both rollers rotating and being heated in order to maintain the temperature at which the thermoplastic of the sheet 12 is malleable.

The purpose of the device 100 is to convert the sheet 12 into a tape 13 of constant thickness formed by bringing the yarns 11 together so as to be touching, in order to create transverse continuity in the said tape. Thus, the device 100 concentrates the sheet around the central axis of the line in order to reduce its width, which had been increased during its passage through the impregnation device 80, and recentres the sheet with respect to the central axis of the manufacturing line in order to suitably guide the tape downstream towards the calender 110.

The gathering and guiding towards the centre is achieved by the hyperboloidal shape of the upper roller 102 which, by adjusting its height, also allows light pressure to be applied to the upper surface of the sheet in order to concentrate it.

The counterrotation of the rollers 101 and 102 firstly prevents the thermoplastic from drying and secondly prevents it from accumulating, which could impair the uniformity of its distribution and consequently the thickness of the tape.

Figure 6:
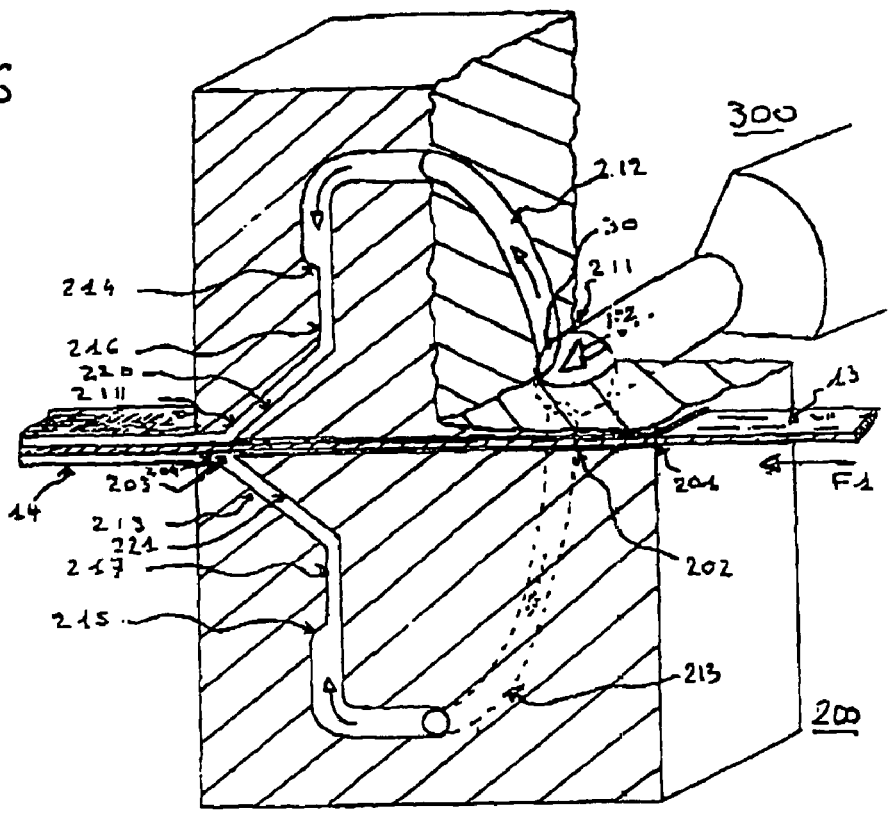

Located after the first shaping device 100 is a second shaping device 200, which can be seen in FIG. 6. The shaping device 200 is a die fed, on the one hand, with at least one tape 13 obtained as described above, and, on the other hand, by a means 300, especially an extruder known to those skilled in the art, which delivers, under pressure, at least one second molten thermoplastic organic material 30.

FIG. 6 shows a partially exploded cross section of the shaping device 200, shown in perspective. The cross section is made perpendicular to the plane of the tape 13, and in the running direction of the tape 13. The exploded part makes it possible to show the means 300 for delivering the thermoplastic 30 and the path of the latter through the shaping device 200.

The shaping device 200 consists of an inlet 201 for a tape 13, introduced in the direction of the arrow F1, and of an inlet 211 for the second thermoplastic 30, introduced in the direction of the arrow F2.

The tape 13 runs through a cavity 202 and then into a cavity 203.

The thermoplastic 30 travels through the channels 212, 213 located away from the cavity 202. These channels are intended to feed the cavity 203 with thermoplastic 30 from several sides.

The channels 212, 213 include restrictions 214, 215 in order to run into channels of smaller cross section than that of the channels 212, 213. Thus overpressures may be created in the molten thermoplastic 30.

The channels run into the cavity 203.

The latter cavity 203 is bounded by walls 218, 219 consisting of inclined planes which terminate in an outlet 204. Thus, a convergent system is obtained which makes it possible to deliver the thermoplastic 30 in contact with the tape 13. The overpressure P applied makes it possible to create an intimate contact between the thermoplastic 30 and the tape 13, while preventing any backflow of the thermoplastic towards the upstream.

The cavity 203 may be designed so that the thermoplastic 30 converges uniformly in all directions around the tape 13. To obtain this function, it is especially possible to use a frustoconical guide having included walls 220, 221 which is located around the cavity 202.

It is thus possible to direct the stream of thermoplastic 30 so as to position a tape 13 in a desired configuration and thus obtain a profile 14 in which the reinforcement is placed in a defined geometry according to the chosen applications.

It should be noted that the position of the extruder 300 shown here as a crosshead is in no way limiting. This is because it may be located at any position about the axis of travel of the tape 13.

Furthermore, an apparatus for implementing the process may also be envisaged in which the extruder is placed along the direction in which the profile runs. In particular, it may be envisaged that the extruder 300 delivers thermoplastic 30 along the running axis of the profile 14, 10 and in which at least one tape 13 is brought into at least any one direction and converges on the running axis of the profile 14, 10 after it has penetrated the shaping device 200.

It is thus possible to obtain profiles 10 reinforced with several tapes 13.

A device 110 is located downstream of the device 200 which guides the profile 14, the cooling of which starts right from the die exit in contact with the ambient air, towards the specific cooling means for the purpose of fixing the dimensional characteristics of the profile and giving it its final appearance so as to have a finished profile 10. The device 110 cools the profile 14 in order to freeze the second thermoplastic, giving it a smooth surface appearance.

This device 110 may be a calender consisting of rolls, possibly cooled by internal circulation of water. More advantageously, this will be a cold die having the same outline and the same dimensions as the hot die 100, its temperature possibly being between room temperature and 200° C., for example.

The final cooling of the tape is achieved by means of the cooling tank 120, especially a water tank, located after the calender 110, through which tank the profile 14 passes as it runs along. The tank 120 may include means for spraying the coolant onto the profile 10.

During all its cooling operations, the entire mass of the second thermoplastic freezes, as does the first thermoplastic, in order to consolidate the yarns and to bind the fibrous reinforcements to the matrix of the second thermoplastic.

Installed beyond the cooling tank is a caterpillar haul-off 130 which constitutes, in a known manner, a means of entraining the yarns and the tape, by exerting a tensile force all along the line. It sets the pay-out speed and the run speed of the sheet and then of the tape.

Finally, the manufacturing apparatus 1 may include, at the end of the line, a saw intended to cut the profile, so as to make it easier to store it.

The process may be implemented in the following manner.

The start-up of the process begins by manually pulling each yarn 11 off the packages 2 and manually taking it as far as the haul-off 130 where each yarn is then held clamped, all the yarns passing through the various devices described above. In this example of application, there are 35 rovings of glass/polyester co-mingled composite yarn having the trademark TWINTEX®, the 860 tex overall linear density of which comprises 65% glass by weight. The polyester, especially polyethylene terephthalate, therefore constitutes the first thermoplastic.

The oven 70 and the heating elements of the device 1 are raised in temperature in order to reach a temperature well above the melting point of the polyester, i.e. 254° C. in the case of polyethylene terephthalate.

The other means operate at the following temperatures:
members of the impregnation device 80: 290° C.;
rollers of the shaping device 100 according to the embodiment illustrated in FIG. 4: 270° C. to 300° C.;
shaping device 100 according to the embodiment with a die: 310° C.;
second shaping device 200: 190 to 200° C. in that zone where the intimate contact between the tape 13 and the second thermoplastic 30 takes place.

The haul-off 130 is switched on and pay-out from the packages 2 starts.

The yarns 11 pass through the eyelets 31, then astride the bars in the device 40 and are brought together through the tines of the comb 50 in order to form, at the exit, the sheet 12 of parallel yarns.

The sheet 12 then meets the device 60 which removes any static electricity.

Next, the sheet enters the oven 70 so that the first thermoplastic reaches its melting point. Thereafter, it passes between the heated rolls of the device 80 which make it possible for it to be rolled, expelling the air, and for the thermoplastic which thus encapsulates the glass filaments to be uniformly distributed. We should point out that the amount of thermoplastic does not have to be metered since it is directly incorporated into the raw material of the tape by it being co-mingled with the glass filaments. The temperature of the sheet, after it has passed through this device 80, is from 260 to 270° C.

The sheet 12 then runs between the rolls or through the die of the first shaping device 100 in order to convert it into a tape 13, shaped by closing up the yarns against each other and placing them so that they touch each other. After shaping, the tape has a temperature of 270 to 280° C.

A tape 13 then enters the second shaping device 200 after a travel which cools it slightly, especially down to about 210° C.

The said device 200 is fed simultaneously with a second thermoplastic 30.

The contact between the tape 13 and the second thermoplastic 30 takes place at about 190° C. to 200° C.

Next, the profile 14 passes between the rolls of the cold calender 110 which fixes its final shape, by freezing the surface of the second thermoplastic and consolidating the yarns. The profile 10 of the invention is obtained with a constant thickness and a smooth appearance. The profile has a temperature of 100° C. on leaving the calender.

In order to facilitate and speed up the cooling of the entire profile 10, the latter passes through a coolant contained in the tank 120 and becomes, on leaving it, its temperature being 30° C., a solid product sufficiently rigid to be cut up, for ease of storage, transportation and use.

Composite profiles are therefore obtained in which there is an intimate bond between the reinforcing tape and the matrix consisting of the second thermoplastic. When the applied pressure P is high enough, the profile obtained contains no porosity.

To illustrate the benefit of the products obtained by the process described above, profile manufacturing trials were carried out and specimens of these profiles were subjected to mechanical tests.

The profiles manufactured for these tests were solid.

The specimens tested had a rectangular cross section 30 mm in width and 7.5 mm in thickness.

The reinforcing tape measured about 18 mm in width and 1 mm in thickness. A wide face of the tape was located 1 mm from a first wide face of the specimen. The tape was then covered with the second thermoplastic with a thickness of about 5.5 mm from one side and 1 mm from the other side.

The tape was centred on the width of the profile, and therefore surrounded over its width by about 11 mm with the second thermoplastic.

The second thermoplastic was polyvinyl chloride (PVC).

Mechanical strength tests in 3 point bending specimens of 30×7.5 cross section as indicated above, with a distance between supports equal to 20 times the thickness of the specimen, carried out at room temperature, according to the ISO 14125 standard, made it possible to determine the elastic modulus of the profile, [namely: $E_{profile}=3600\pm200$ MPa.

In comparison, a profile of PVC alone having the same dimensions had an elastic modulus of $E_{PVC}=2650$ MPa.

The effect of the reinforcing tape results in an increase in the elastic modulus of the order of 40%.

It is possible to optimize the increase in the modulus of the profile described by shifting the axis of the reinforcing tape with respect to the axis of the neutral fibre of the profile. A second series of trials carried out on profile specimens of the same dimensions, in which the reinforcing tape was further away from the axis of the neutral fibre of the profile, thus made it possible to obtain the following results:

$E_{profile}=4800\pm100$ MPa, i.e. an increase in the elastic modulus of about 80%.

A third series of specimens was produced with a profile having twice the thickness of the previous one, i.e. 15 mm, in which two reinforcing tapes 1 mm in thickness and 18 mm in width were inserted.

The external wide faces of the two tapes were located 1 mm from the wide edge of the profile. There were therefore about 11 mm of second plastic between the internal edges of the two tapes.

For this profile, the following elastic modulus was therefore obtained:

$E_{two\text{-}tape\ profile}=7350\pm200$ MPa.

The increase in the elastic modulus over PVC alone is almost a factor of 3.

Further mechanical strength tests in 3 point bending were carried out on a fourth series of specimens, varying the temperature of the specimen.

The specimens tested had a rectangular cross section 13 mm in width and 3.7 mm in thickness, the reinforcing tape having a thickness of about 1 mm still being located about 1 mm from a first face of the specimen. The distance between supports was therefore 48 mm.

Figure 7:
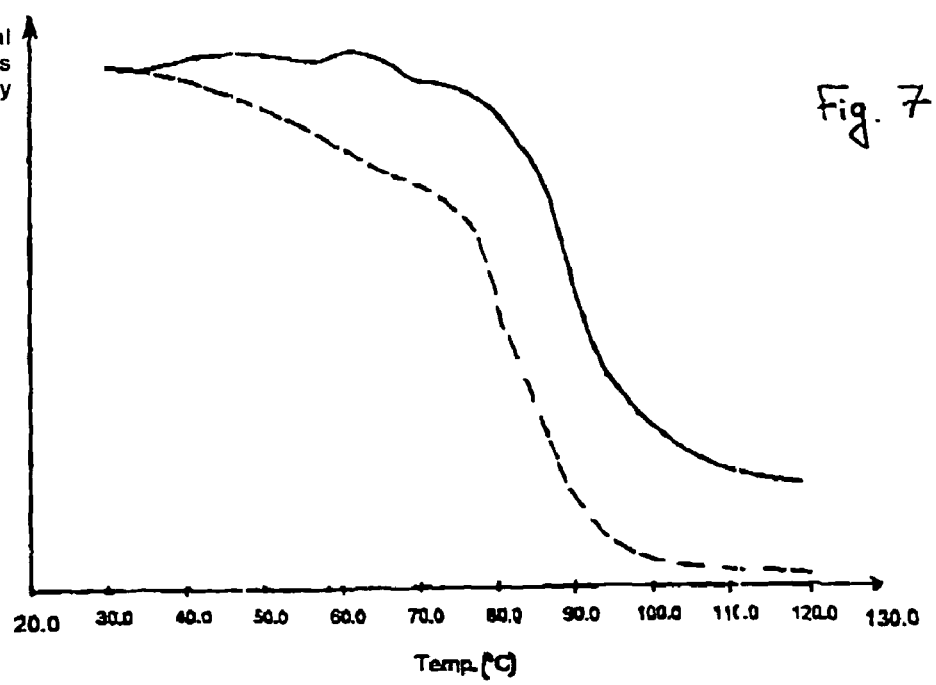
FIG. 7 shows the variation in mechanical properties as a function of temperature of a profile obtained according to the invention.

The mechanical tests carried out within a 30 to 120° C. temperature range made it possible to determine the elastic modulus of the profile at each of the test temperatures. The variation in the modulus is shown in FIG. 7 by the solid curve for a profile reinforced according to the invention and by a broken line for an non-reinforced profile. FIG. 7 shows the relative modulus variations, which is why the two curves start from the same starting point at 30° C.

Given the relatively unfavourable geometry of the profile with a reinforcement located relatively close to the axis of the neutral fibre of the profile, the difference in modulus at room temperature is, however, relatively less pronounced than in the previous series of tests.

In the case of the non-reinforced PVC specimen, a very rapid reduction in the elastic modulus is observed when the temperature increases, with a glass transition at a temperature of around 100° C. By way of indication, the modulus is of the order of 1000 MPa at 80° C. and of the order of a few MPa at 120° C.

For the reinforced PVC specimen, a degree of stability of the elastic modulus is observed when the temperature increases, at least up to 70-80° C., with a less rapid drop for the higher temperatures with, furthermore, a glass transition at a temperature of around 90° C. By way of indication, the modulus is greater than 2000 MPa at 80° C. and around 500 MPa at 120° C.

It has thus been demonstrated that there is excellent load transfer between the thermoplastic matrix and the reinforcement at room temperature and at high temperature.

Without wishing to be bound by this explanation, it is assumed that it is the excellent cohesion provided by the various steps of the process, and especially the construction of a tape from glass fibres and organic fibres, which gives these remarkable properties.

The methods of implementation and the embodiments described above are in no way limiting and it is possible to envisage, in particular, manufacturing a profile in which the reinforcing tape is not substantially flat but assumes an angular or curved configuration.

It is thus possible to envisage manufacturing plastic pipes, for example made of polypropylene, with an internal, median, or external tubular reinforcement, intimately mixed with the plastic of the pipe. The tubular reinforcement consists of a tape formed from continuous yarns in which the thermoplastic is advantageously polypropylene in the case of the example, the tape being wound along its running axis prior to or concomitantly with its passage through the extrusion die. The plastic of the pipe may advantageously be chosen, treated or combined with another material so as to give a particular appearance or feel, especially with a coating of elastomer.

The process according to the invention can thus be applied to the production of rods, rails, pipes or hoses, covering materials such as weatherboards (wall cladding), stakes, etc.

The invention claimed is:

1. A process for manufacturing a composite profile based on a thermoplastic organic material reinforced by reinforcing fibres, including making a multiplicity of continuous reinforcing yarns come into contact with a thermoplastic organic material and shaping the composite profile, comprising:

bringing together continuous yarns based on continuous glass fibres and on a first thermoplastic to be parallel and forming at least one consolidated tape by heating the continuous yarns, wherein in the at least one tape glass fibres are impregnated with the first thermoplastic; and introducing the at least one tape into a first cavity of a die and simultaneously introducing at least one second molten thermoplastic organic material into a second cavity of the die, wherein the second cavity is separated from the first cavity by at least one frustoconical guide, the frustoconical guide includes a restriction portion configured to prevent backflow of the second molten thermoplastic organic material into the first cavity, thereby causing the second molten thermoplastic organic material to come into contact with and fuse to at least a top and bottom portion of the at least one tape in the second cavity; and outputting a second tape having a profile of at least one second thermoplastic organic material reinforced by the at least one tape.

2. The process according to claim 1, wherein the at least one tape is fonned from continuous yarns comprising glass yarns and organic fibres of the first thermoplastic.

3. The process according to claim 1, wherein the continuous yarns that are brought together include continuous glass filaments and continuous filaments of the first thermoplastic that are co-mingled together.

4. The process according to claim 1, wherein the bringing together comprises:

entraining and bringing together continuous yarns based on the first thermoplastic and on the glass fibres in a parallel manner in a form of at least one sheet;

causing the at least one sheet to enter a zone to be heated to a temperature reaching at least a melting point of the first thermoplastic without reaching a softening temperature of the glass fibres;

causing the at least one sheet to pass through an impregnation device, while maintaining its temperature at a temperature at which the first thermoplastic is malleable, to distribute the first molten thermoplastic uniformly and to impregnate the glass fibres therewith.

5. The process according to claim 4, wherein the at least one sheet is introduced into a first shaping device, while maintaining its temperature at a temperature at which the first thermoplastic is malleable, to obtain the at least one tape formed by bringing the continuous yarns together to be touching, thereby creating transverse continuity.

6. The process according to claim 4, further comprising unreeling, from wound packages, a continuous yarn of reinforcing filaments and filaments of the first thermoplastic and, while the continuous yarns are being brought together in the form of a sheet, regulating tension in the continuous yarns.

7. The process according to claim 4, further comprising stripping the continuous yarns of any static electricity before the at least one sheet passes into the heating zone.

8. The process according to claim 1, wherein the profile is cooled to fix its dimensional characteristics and its appearance to deliver the profile.

9. The process according to claim 1, further comprising cutting up the profile at an end of a manufacturing line, to be stored.

10. The process according to claim 1, wherein the first thermoplastic is a polyester and the second thermoplastic is polyvinyl chloride.

11. The process according to claim 1, wherein the second molten thermoplastic organic material converges uniformly from all directions around the tape.

* * * * *